March 13, 1934.  J. B. SINDERSON  1,950,419
ANTI-BACK-LASH DEVICE
Filed June 17, 1929  2 Sheets-Sheet 1
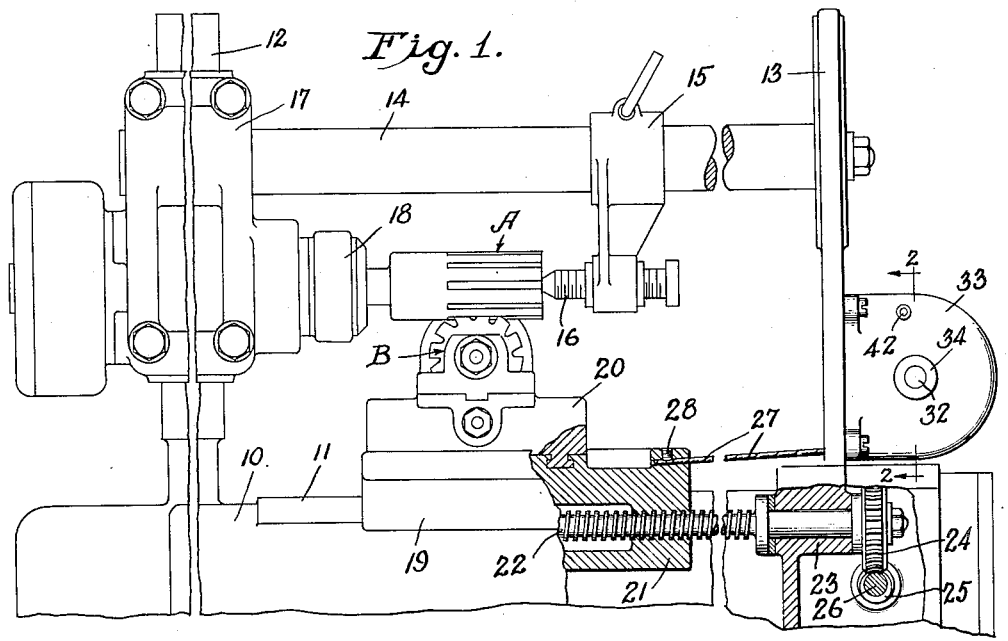
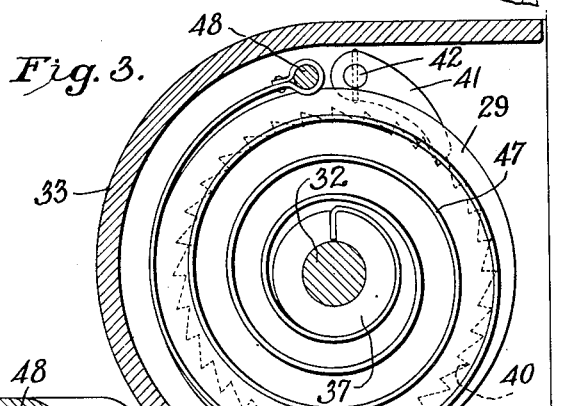
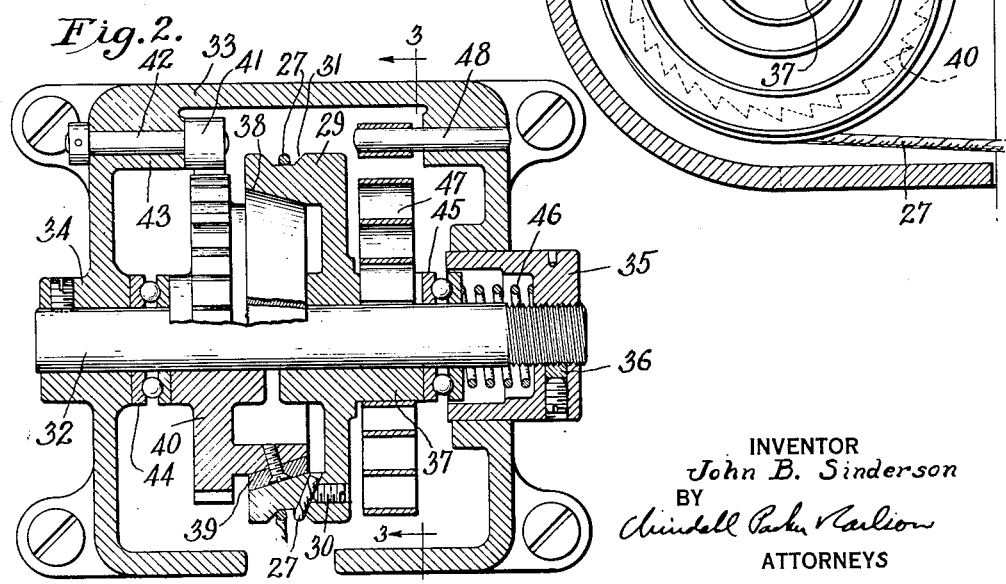
INVENTOR
John B. Sinderson
BY
ATTORNEYS March 13, 1934.   J. B. SINDERSON   1,950,419
ANTI-BACK-LASH DEVICE
Filed June 17, 1929   2 Sheets-Sheet 2
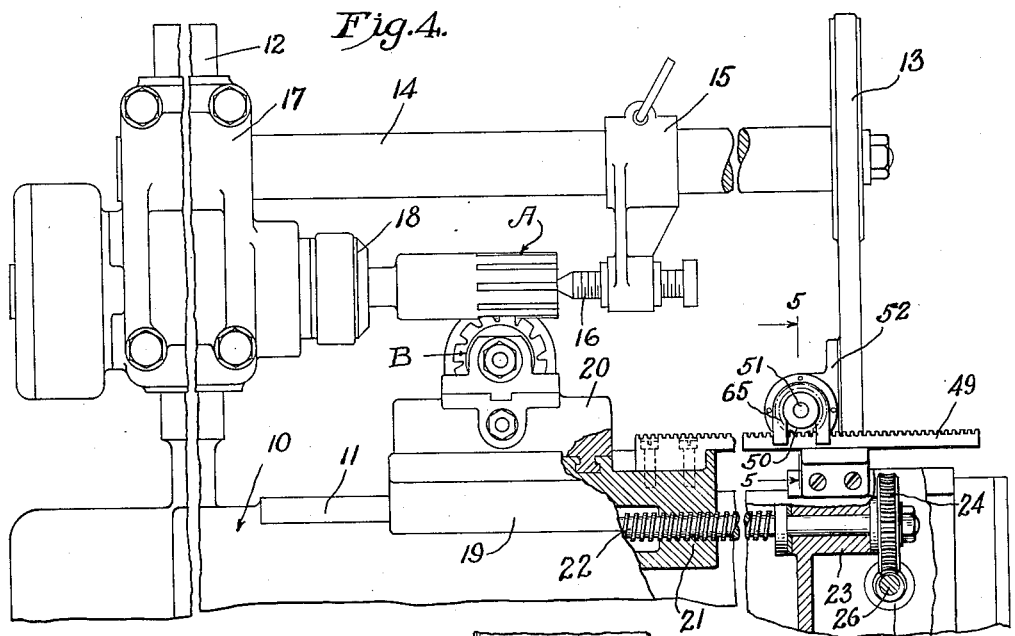
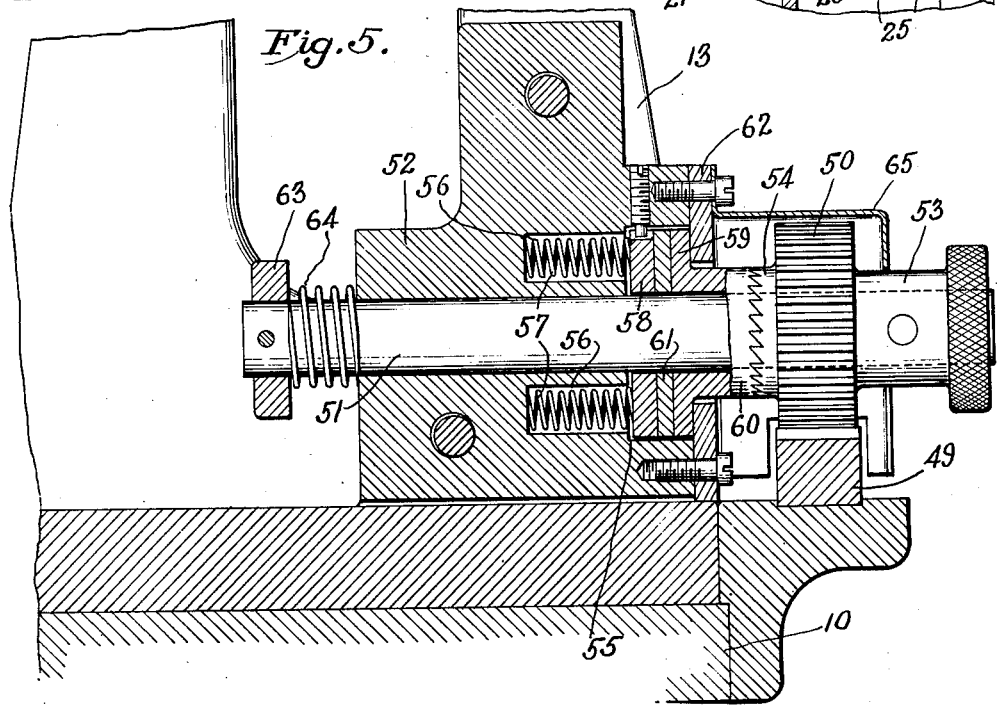
INVENTOR
John B. Sinderson
BY
ATTORNEYS Patented Mar. 13, 1934

1,950,419

UNITED STATES PATENT OFFICE 1,950,419

ANTI-BACK-LASH DEVICE

John B. Sinderson, Rockford, Ill., assignor to Barber-Colman Company, Rockford, Ill., a corporation of Illinois Application June 17, 1929, Serial No. 371,682

15 Claims. (Cl. 90—1)

The present invention relates to improvements in anti-back lash devices for snubbing the movement of movable machine parts, such for example as the tool slide of a hobbing machine.

In various metal cutting machines having toothed cutting elements, and particularly in hobbing machines, the cutting element and the support therefor tend to chatter when the element first enters the work. A substantial portion of this chatter results from the tendency of the support to jump forwardly under the pressure of the driving means as successive teeth of the cutting element pass over the edge of the work at the beginning of the cut. After the cutting element has fully entered the work, and the likelihood of chatter no longer exists, it is impracticable to increase the rate of feed. As a result, the amount of permissible feed is frequently limited, thereby reducing the efficiency and output of the machine.

The primary object of the present invention therefore resides in the provision of novel means for automatically exerting a drag on the movable element of the machine during the cutting stroke so as to permit a relatively high rate of feed without resulting in chatter.

A more specific object resides in the provision of means of the foregoing character which is operable to apply a frictional drag to the movable element of the machine during the cutting stroke, and which is inoperable during the return stroke.

Further objects and advantages will become apparent as the description proceeds.

In the accompanying drawings, Fig. 1 is a fragmentary elevational view of a hobbing machine to which an anti-back lash device embodying the features of my invention has been applied.

Fig. 2 is a sectional view of the device on an enlarged scale taken along line 2—2 of Fig. 1.

Fig. 3 is a sectional view taken along line 3—3 of Fig. 2.

Fig. 4 is a view similar to Fig. 1 of a hobbing machine embodying a modified form of the invention.

Fig. 5 is a fragmentary sectional view on an enlarged scale taken along line 5—5 of Fig. 4.

While the invention is susceptible of various modifications and alternative constructions, I have shown in the drawings, and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims. While the invention is adapted for use in connection with a variety of power driven machine parts, it is particularly adapted for use on metal cutting machines employing toothed cutters, and hence for purposes of illustration is described in connection with a hobbing machine of standard construction.

Referring more specifically to the drawings, the hobbing machine comprises a suitable base 10 having a horizontal guide 11 and spaced uprights or supporting standards 12 and 13. A horizontal beam 14 spans the uprights 12 and 13, and serves as a supporting guide for an adjustable depending tailstock bracket 15 carrying an adjustable work supporting center 16 in its free end. Mounted for vertical adjustment on the standard 12 is a suitable headstock 17, comprising a chuck 18 which is adapted to be rotated by any suitable power means, and in which a work blank A is adapted to be secured. The center 16 and the chuck 18 serve to support the work blank A securely for rotation in a fixed position.

Mounted on the guide 11 for reciprocation longitudinally of the work blank A is a suitable tool slide 19. A table 20 is mounted on the slide 19 for rotary adjustment about a vertical axis, and supports a rotary cutting element B. In the present instance, the cutting element B comprises a hob which is adapted to operate on the work blank A, and to be rotated by any suitable power means (not shown).

The slide 19 is provided with an integral depending nut 21 in threaded engagement with a rotary feed screw 22 anchored against endwise movement in a suitable bearing 23 in one end wall of the base 10. Secured to the outer end of the feed screw 22 is a worm gear 24 meshing with a worm 25 on a shaft 26 adapted to be connected to a suitable reversible power drive (not shown). In operation, the feed screw 22 is actuated to feed the hob B to the left longitudinally of the blank A in a cutting stroke, and then to return the hob to its initial position. The parts thus far described are old and well known, and per se constitute no part of the invention.

At the start of each cutting stroke, when the teeth of the hob B first begin to enter the work, there is a tendency for the hob and the slide 19 to chatter due to the periodic release of the cutting resistance as the successive teeth pass over the end edge of the blank A. The tendency to chatter is increased upon an increase in the rate of feed and hence has heretofore served in many instances to limit the latter, thereby lowering the efficiency and capacity of the machine.

An important feature of the present invention therefore resides in the provision of means for applying a constant pressure resisting the movement of the slide 19 during the cutting stroke so as to take up back lash and to prevent chatter. In the form shown Figs. 1, 2 and 3, this means comprises a cable 27 of suitable material, one end of which is secured to the slide 19 as by means of a set screw 28, and the other end of which is wound about a suitable rotary drum 29 and anchored therein as indicated at 30. Preferably, the drum 29 is formed with a peripheral groove 31 adapted to receive the cable 27. The drum 29 is mounted for rotation on a fixed shaft 32, suitably disposed in a housing 33 removably secured to the standard 13. In the present instance, one end of the shaft 32 is rigidly secured in a tubular support 34 in one side wall of the housing 33, and the other end has adjustably threaded thereon an inwardly opening cup-shaped spring seat 35 slidably mounted in the other side wall of the housing. The spring seat 35 is adapted to be secured in any position of adjustment on the shaft 32 by means of a suitable screw actuated clamp 36.

Means is provided for applying a drag to the rotation of the drum 29 in a counter-clockwise direction as viewed in Fig. 3. To this end, the drum 29 is formed on one end with a hub 37 projecting toward the spring seat 35, and on the other end with an internal friction cone 38. An external friction cone 39 is arranged to coact with the cone 38 and is formed integral with a ratchet 40 mounted for rotation on the shaft 32. A gravity pawl 41 is mounted on a shaft 42 rotatable in a bearing 43 formed in the housing 33, and engages the periphery of the ratchet 40 to hold the latter against rotaton with the drum 29 during the cutting stroke of the hob B. Thus, the ratchet 40 and pawl 41 constitute in effect a one-way clutch. Interposed between the support 34 and the ratchet 40 is an anti-friction thrust bearing 44. A similar bearing 45 engages the free end of the hub 37. Interposed in end abutting relation between the spring seat 35 and the hub 37 is a compression coil spring 46 which urges the friction cones 38 and 39 yieldably into engagement. The frictional drag may be varied by adjusting the pressure of the spring 46 through the spring seat 35.

Coiled about the hub 37 is a spiral spring 47 which is anchored at its inner end in the hub and at its outer end to a pin 48 mounted in the housing 33. The spring 47 serves to apply a resilient drag to the slide 19 during the cutting stroke, and to keep the cable 27 taut during the return stroke.

In operation, the cable 27 serves during the cutting stroke, to rotate the drum 29 against the frictional resistance created by the cones 38 and 39, and against the force of the spring 47. The resulting pressure serves to hold the slide 19 and the hob B against chatter and play. As a result the hob B can be moved into the work A at a relatively high rate of feed. During the return stroke, the spring 47 reverses the rotation of the drum 29 and hence maintains the cable 27 taut. The cone 38 rotates with the drum 29 so that no frictional drag is applied.

In Figs. 4 and 5, a modified form of the invention is shown. In this instance, an elongated rack bar 49 extending in the direction of reciprocation is secured at one end to the slide 19.

The bar 49 meshes with a spur gear 50 on one end of a shaft 51 slidably mounted in a bearing block 52 removably secured to the standard 13. The spur gear 50 is formed on its outer end with a hub 53 which is pinned fast to the shaft 51, and is formed on its inner end with a one-way clutch element 54. The bearing block 52 is formed with a cylindrical recess 55 concentric with the shaft 51 and opening toward the gear 50, and with a plurality of peripherally spaced spring seats 56 extending inwardly from the inner end of the recess. Disposed in the spring seats 56 are a plurality of compression coil springs 57 which project therefrom partially into the recess 55. An inner friction plate 58 held against rotation is disposed in the inner end of the recess 55 about the shaft 51, and bears against the outer ends of the springs 57. An outer friction plate 59 is disposed in the outer end of the recess 55 and is formed with a clutch element 60 adapted to coact with the clutch element 54. An intermediate friction plate 61 is interposed in bearing engagement between the brake members 58 and 59. The plates 58, 59 and 61 are held in assembled relation in the recess 55 by means of a suitable retaining ring 62 secured to the bearing block 52 and overlapping the plate 59. The springs 57 tend to hold the parts in frictional engagement.

The end of the shaft 51 remote from the gear 50 is provided with a collar 63. A coiled compression spring 64 is interposed between the block 52 and the collar 63 and tends to urge the clutch elements 54 and 60 into operative engagement, and also permits the shaft 51 to slide in the block sufficiently to permit the clutch elements to move over each other. The gear 50 and the clutch 54—60 are partially enclosed by a suitable shield 65 secured to the ring 62.

In operation, as the slide 19 moves to the left in the cutting stroke, the clutch elements 54 and 60 are operatively connected to rotate the outer brake member 59. Thereupon, a frictional drag is applied to the slide. On the return movement, the clutch element 54 will move over the clutch element 60, this movement being permitted by the spring 64, so that no frictional drag will be applied.

I claim as my invention:

1. An anti-back lash device for hobbing machines comprising, in combination with a base and a slide reciprocable on said base and adapted to carry a hob, a bracket on said base, a shaft in said bracket, a friction cone rotatable on said shaft, a ratchet member formed rigid with said cone, a gravity pawl pivotally mounted in said bracket and arranged to engage said ratchet member to hold the latter against rotation in one direction, a drum slidably and rotatably mounted on said shaft and formed rigid with a friction cone arranged to coact with said first mentioned friction cone, spring means coacting with said drum to urge said friction cones into engagement, means for adjusting the pressure of said spring means, a cable wound about said drum, one end of said cable being anchored to said drum and the other end of said cable being anchored to said slide, and a flat spiral spring coiled about said shaft and anchored at one end to said drum and at the other end to said bracket, said last mentioned spring tending to rotate said drum relative to said pawl to wind said cable onto said drum.

2. An anti-back lash device for a movable machine tool element comprising, in combination, a supporting base for said element, a bracket on said base, a shaft in said bracket, a friction cone rotatable on said shaft, a ratchet member formed rigid with said cone, a pawl pivotally mounted in said bracket and arranged to engage said ratchet member to hold the latter against rotation in one direction, a drum slidably and rotatably mounted on said shaft and formed rigid with a friction cone arranged to coact with said first mentioned friction cone, spring means coacting with said drum to urge said friction cones into engagement, a cable wound about said drum, one end of said cable being anchored to said drum and the other end of said cable being anchored to said element, and spring means tending to rotate said drum in a direction opposite to said one direction to wind said cable onto said drum.

3. An anti-back lash device for hobbing machines comprising, in combination with a base and a machine element movable on said base, a bracket on said base, a shaft in said bracket, a friction cone rotatable on said shaft, a one-way clutch coacting with said cone to hold the latter against rotation in one direction, a member slidably and rotatably mounted on said shaft and having a friction cone arranged to coact with said first mentioned friction cone, yieldable means tending to urge said friction cones into engagement, and means operatively connecting said member and said element for synchronous movement.

4. In combination with a base, a slide reciprocable on said base, and means for reciprocating said slide, a bracket on said base, a shaft in said bracket, a friction cone rotatable on said shaft, a one-way clutch between said bracket and said cone for holding the latter against rotation in one direction, a drum slidably and rotatably mounted on said shaft and formed rigid with a friction cone arranged to coact with said first mentioned friction cone, spring means acting on said drum axially of said shaft to urge said friction cones into engagement, a cable wound about said drum, one end of said cable being anchored to said drum and the other end of said cable being anchored to said slide, and spring means tending to rotate said drum to wind up said cable.

5. In combination with a support, a slide on said support, and means for reciprocating said slide, a member mounted for rotation on said support and having a friction element, means operatively connecting said slide to said member to rotate the latter in one direction in timed relation to the reciprocation of said slide, a friction element mounted for rotation on said support and arranged to coact with said first mentioned friction element, and a pawl and ratchet mechanism for holding said last mentioned element against rotation in said one direction.

6. In combination with a support, a member movable on said support and means for driving said member, a pair of coacting friction elements movably mounted on said support, means including a flexible connection and for operatively connecting said member to one of said elements to drive the latter in one direction in synchronism with said member, and means automatically operable to hold the other of said elements against movement with said first mentioned friction element in said one direction so as to apply a frictional drag to the movement of said member.

7. In combination with a support, a member movable on said support, and means for reciprocating said member, a pair of coacting friction elements movably mounted on said support, means operatively connecting said member to one of said friction elements to move the latter in one direction in synchronism with said member, and means automatically operable to hold the other of said friction elements against movement with said first mentioned friction element during movement of said member in said one direction, said last mentioned means being inoperable during movement of said member in the other direction.

8. In combination with a support, a member movable on said support, and means for driving said member in opposite directions, two rotary friction elements, means for urging said elements into frictional engagement, a rotary member for driving one of said elements, and drive means including a flexible cable secured at one end to said movable member and for operatively connecting said rotary member to said movable member and operable to cause said members to move in synchronism.

9. In combination, a base, a member movable on said base, means for driving said member in opposite directions, a support on said base, a friction element rotatable on said support, a one-way clutch coacting with said element to hold the latter against rotation in one direction, a second friction element rotatable on said support and arranged to coact with said first mentioned friction element, and drive means operatively connecting said member with said second friction element to drive the latter in one direction in synchronism with said member against the frictional resistance between said elements.

10. An anti-back lash device for a movable machine tool member comprising, in combination, a supporting base for said member, a bracket on said base, a shaft in said bracket, a ratchet rotatable on said shaft, a pawl pivotally anchored in said bracket and engaging said ratchet to hold the latter against rotation in one direction, a friction element rotatable with said ratchet, a second friction element on said shaft in opposed relation to said first mentioned element, said elements being relatively axially slidable on said shaft for movement into coacting frictional engagement, adjustable spring means urging said elements into such engagement, and a flexible cable anchored to said member and having an operative drive connection with said second element for rotating said second element in said one direction in synchronism with the movement of said member.

11. An anti-back lash device for a movable machine tool member comprising, in combination, a fixed support, a rotatable friction element on said support, a one-way clutch for holding said element positively against rotation in one direction, a second rotatable friction element in opposed relation to said first mentioned element, said elements being relatively axially adjustable for movement into coacting frictional engagement, spring means urging said elements into such engagement, and a flexible cable connected to said member and having an operative drive connection with said second element for rotating said second element in said one direction in synchronism with the movement of said member.

12. An anti-back lash device for a movable machine tool member comprising, in combination, a fixed support, a movable friction element on said support, means for resisting movement of said element in one direction, a second movable friction element in opposed relation to said first mentioned element, said elements being relatively adjustable for movement into coacting frictional engagement, yieldable means urging said elements into such engagement, and a flexible cable connected to said member and having an operative drive connection with said second element for moving said second element in said one direction in synchronism with the movement of said member.

13. An anti-back lash device for a movable machine tool member comprising, in combination, a fixed support, a shaft on said support, a ratchet rotatable on said shaft, a pawl engaging said ratchet to hold the latter against rotation in one direction, a friction element rotatable with said ratchet, a second friction element on said shaft in opposed relation to said first mentioned element, said elements being relatively axially slidable on said shaft for movement into coacting frictional engagement, yieldable means urging said elements into such engagement, and a flexible cable connected to said member and having an operative drive connection with said second element for rotating said second element in said one direction in synchronism with the movement of said member.

14. An anti-back lash device for hobbing machines comprising, in combination with a base, a slide reciprocable on said base and adapted to carry a hob, and means for reciprocating said slide, a bracket on said base, a shaft in said bracket, a friction element rotatable on said shaft, a one-way clutch for resisting rotation of said member in one direction, a drum rotatably mounted on said shaft, a second friction element rotatable with said drum and adapted to coact with said first mentioned element, said elements being relatively axially adjustable, spring means urging said elements into engagement, a cable wound about and anchored to said drum, said cable also being anchored to said slide, and yielding means acting on said drum and tending to rotate same in a direction opposite to said one direction tending to wind said cable thereon.

15. In combination with a base, a member slidable on said base, and means for sliding said member, a support on said base, a shaft in said support, a friction element rotatable on said shaft, a one-way clutch between said support and said element after holding the latter against rotation in one direction, a drum slidably and rotatably mounted on said shaft, a second friction element rotatable with said drum and arranged to coact with said first mentioned element, means urging said elements into engagement, a cable wound about said drum, one end of said cable being anchored to said drum and the other end of said cable being anchored to said member, and means tending to rotate said drum in a direction opposite to said one direction.

JOHN B. SINDERSON.